(12) United States Patent
Gador et al.

(10) Patent No.: US 6,793,778 B2
(45) Date of Patent: Sep. 21, 2004

(54) METHOD OF FABRICATING SLIDER PADS FOR A TRANSDUCER OPERATING WITH MOVING MAGNETIC MEDIA

(75) Inventors: Detlef Gador, Mainz (DE); Cherngye Hwang, San Jose, CA (US); Eun Kyoung Row, San Jose, CA (US); Ning Shi, San Jose, CA (US)

(73) Assignee: Hitachi Global Storage Technologies Netherlands N.V., Amsterdam (NL)

( * ) Notice: Subject to any disclaimer, the term of this patent is extended or adjusted under 35 U.S.C. 154(b) by 0 days.

(21) Appl. No.: 10/196,006

(22) Filed: Jul. 15, 2002

(65) Prior Publication Data

US 2004/0007454 A1 Jan. 15, 2004

(51) Int. Cl.[7] ............................ C23C 14/34; B44D 1/22; B05D 1/36
(52) U.S. Cl. ............................ 204/192.11; 204/192.12; 216/12; 216/52; 216/58; 216/67; 216/83; 427/402
(58) Field of Search ........................ 204/192.11, 192.12, 204/192.32; 216/12, 52, 83, 58, 67; 427/402

(56) References Cited

U.S. PATENT DOCUMENTS

| | | | |
|---|---|---|---|
| 4,555,303 A | 11/1985 | Legge et al. ................. | 156/643 |
| 4,659,650 A | 4/1987 | Moritz et al. ................ | 430/313 |
| 5,091,288 A | 2/1992 | Zappella et al. ............. | 430/311 |
| 5,271,802 A | 12/1993 | Chang et al. ................ | 156/643 |
| 5,654,128 A | 8/1997 | Hsu ............................ | 430/324 |
| 5,709,754 A | 1/1998 | Morinville et al. .......... | 134/1.3 |
| 6,055,128 A | 4/2000 | Dorius ........................ | 360/105 |
| 6,236,543 B1 | 5/2001 | Han et al. ................. | 360/236.6 |
| 6,254,792 B1 * | 7/2001 | Van Buskirk et al. ........ | 216/13 |
| 6,278,582 B1 | 8/2001 | Okawa et al. ............ | 360/235.2 |
| 6,333,835 B1 | 12/2001 | Kang et al. ............... | 360/235.4 |
| 2002/0127342 A1 * | 9/2002 | Watanuki et al. ........... | 427/402 |

FOREIGN PATENT DOCUMENTS

JP          55122873 A1    9/1980      ............. C23F/1/00

OTHER PUBLICATIONS

Wayne Moreau, *Semiconductor Lithography, Principles, Practices and Materials*, Plenum Press 1988, ISBN 0–306–42185–2, pp. 567–630.

* cited by examiner

*Primary Examiner*—Steven Versteeg
(74) *Attorney, Agent, or Firm*—G. Marlin Knight

(57) ABSTRACT

A method for fabricating a transducer with landing pads without edge fences is described. Preferably an adhesion layer and then the pad layer are deposited in voids in a photoresist. The thickness of the masking layer on the surface of the pad layer should be sufficient to protect pad layer during the subsequent ashing step, but the thickness of the masking material at the sidewalls on the pad layer fences should be thin enough so that the fences are not protected during ashing. After stripping the photoresist material, the structure is ashed preferably by an oxygen-containing plasma. The ashing process, with assistance from mechanical abrasion, removes the fence structures on the pad layer, since the thinner masking layer at the sidewalls provides less protection to the fence structures than is provided to the bulk of the pad layer where the masking layer is thicker.

29 Claims, 6 Drawing Sheets

METHOD OF FABRICATING SLIDER PADS FOR A TRANSDUCER OPERATING WITH MOVING MAGNETIC MEDIA

FIELD OF THE INVENTION

The invention relates to the field of magnetic transducers (heads) used with moving magnetic media and more particularly to methods for fabricating pads on slider surfaces including the air bearing surface of the transducers that confront the moving media in data storage systems.

BACKGROUND OF THE INVENTION

A typical prior art head and disk system 10 is illustrated in FIG. 1. In operation the magnetic transducer 20 is supported by the suspension 13 as it flies above the disk 16. The magnetic transducer, usually called a "head" or "slider" is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. Typically there are two pairs of electrical contact pads (not shown); one pair each for-the read and write heads 12, 23. Wires or leads 14 are connected to these pads and routed in the suspension 13 to the arm electronics (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded. The read head 12 reads magnetic transitions as the disk rotates under the air-bearing surface (ABS) of the head 20. In the typical process of fabricating thin film magnetic transducers, a large number of transducers are formed simultaneously on a wafer. After the basic structures are formed the wafer may be sliced into quadrants or rows which are further processed by lapping and formation of the pad structures by prior art lithographic etching techniques. Ultimately the rows are sliced into individual transducers.

The ABS of magnetic transducer 20 illustrated in FIG.. 2 is conventionally fabricated with a pattern of rails 27 that extend toward the media from the slider body 28 to determine the aerodynamics and serve as the contact area should the transducer come in contact with the disk either while rotating or when stationary. Landing pads 29 or bumps have been formed on the rails and other areas of the ABS to reduce the stiction that results when the rails contact a stationary surface. Only a few pads have been shown for illustration, but there could be hundreds of microscopic pads on or near the rails. These pads have conventionally been formed by laser heating of spots on the rail surface, but photolithography is also used to form multi-layered pad structures. The invention which will be described below is a process for making the pads using photolithography. The pads can be formed by a photolithographic technique in which a photoresist pattern is formed with voids in the areas for the pads. The pad material(s) is then deposited over the entire surface including the photoresist. When the photoresist is removed the pad material deposited on the photoresist material is removed leaving the pads in the voids in the photoresist. The photoresist is typically removed by application of a liquid solvent accompanied by brushing. One problem with the prior art photolithographic technique is that the pads tend to have a ridge or fence of material around the outer edge due to the deposition of the pad material on the sidewalls of the photoresist surrounding the pad area. This fence material is potentially damaging to the disk and may fracture into debris which can damage the disk and other components in the drive.

U.S. Pat. No. 6,236,543 to Han, et al. titled "Durable Landing Pads for an Air-Bearing Slider" addresses the delamination problem for the pads which tends to accompany the use of very hard materials which typically have higher stress. A solution to this problem is said to include forming pads of tetrahedral amorphous carbon (t-aC), an extremely hard material, and reducing the stress by interleaving at least one layer of a stress-reducing material such as Si, SiC, $SiO_2$ or $Si_3 N_4$. A rotating angled deposition of the t-aC is suggested to round the pad tops, which may be trimmed to smooth corners.

What is needed is a method for making durable slider pads with minimized fence structures.

SUMMARY OF THE INVENTION

A method for fabricating a transducer with landing pads without edge fences will be described herein. The pad shape and location are defined by voids in a photoresist formed on or near the rail surfaces using prior art methods. Preferably the initial layer for the pad structure is deposited as an adhesion or seed layer using a vertical beam angle. The next layer is the pad layer which is preferably deposited at a nonvertical (slanted) angle according to the prior art as dictated by the pad topography. A final masking layer is vertically deposited on the pad layer to provide anisotropic protection during the subsequent ashing step. The vertical deposition processes minimize the buildup of the masking and seed layer materials on the sidewall of the void in the resist. Thus, by vertically depositing the masking layer, the fence structures have a significantly thinner layer of masking and seed layer material than does the planar portion of the structure. The thickness of the masking layer on the surface of the pad layer should be sufficient to protect pad layer during the subsequent ashing by oxygen plasma, but the thickness of the masking material at the sidewalls on the pad layer fences should be thin enough so that the fences are not protected during ashing. The masking layer should be a material that forms a passivating oxide which prevents subsequent penetration of the oxygen plasma. After the layers of material for the pads have been deposited the resist is preferably stripped by a method including mechanical abrasion (e.g. soda blast or by solvent assisted scrubbing). After stripping the photoresist material, the structure is ashed by an oxygen-containing plasma. The ashing process removes the fence structures on the pad layer, since the masking layer provides less protection to the fence structures than is provided to the bulk of the pad layer. Mechanical abrasion provides additional assurance in removal of the fences due to the induced damage to thin masking fragments on the fences. During the ashing it is expected that most of the masking layer will be converted to an oxide which is also structurally discontinuous and not self-supporting. The remaining masking material as well as the oxide material are removed by sputtering etching leaving the pad layer exposed and having no fences.

DETAILED DESCRIPTION OF THE INVENTION AND THE PREFERRED EMBODIMENTS

The adhesion layer and pad layer according to the invention are deposited using prior art techniques which as indicated above result in deposition of material on the side wall which become the fences when the photoresist is removed. The invention utilizes a substantially zero-degree (from normal to the substrate plane) angle of incidence for deposition of the masking layer in pad layer fence elimination. When the masking layer is deposited utilizing highly directional means, for example, ion beams or sputtering preferably with a substrate voltage bias, the deposition rate on to the plane normal to the ion beam is significantly larger than that parallel to the beam. This ratio can typically be about 7 to 1. That is, when deposited substantially from the normal direction (0 degrees from the normal plane), the masking layer thickness along the sidewall of the fences (parallel to the beam) is only about one seventh of that on the pad layer surface (perpendicular to the beam).

This means that there is an "operational range" when the masking layer thickness is thick enough to prevent oxidation of the underlying pad layer, but not thick enough on the fence to protect the "backbone" of the fence from oxygen plasma attack. The exact limits for the thickness of the masking layer to work properly, may vary depending on the specifics of the deposition equipment, the materials being used and parameters such as the oxygen plasma pressure. The masking layer thickness range can be expected to be on the order of 5 to 50 Angstroms. When the masking and seed layers are deposited according to the invention, they will be discontinuous on the fences. Mechanical abrasion from resist stripping further weakens the mask layer on the side wall, but not on the pad surface, since the mask on the pad surface is thicker and to a lesser degree due to the fact that the fence geometry makes it prone to large sideward deflection under mechanical forces. The exposure to the oxygen plasma (ashing) and the mechanical erosion results in the sidewall material becoming fragments of non-self-supporting, spongy, hollow oxide (e.g. SiOx).

On the contrary, if the ion beam deposition or sputtering flux is set at 45 degrees or any other non-directional deposition methods are used, both the pad and the fence surfaces would have had similar masking layer thickness, and similar masking effect. If the masking material thickness is similar on the sidewalls and the planar surface, ashing will not have the anisotropic effect to preferentially ash away the fence material, but not the pad itself. The end result will be that the operational range will be significantly reduced or zero.

Figure 1:
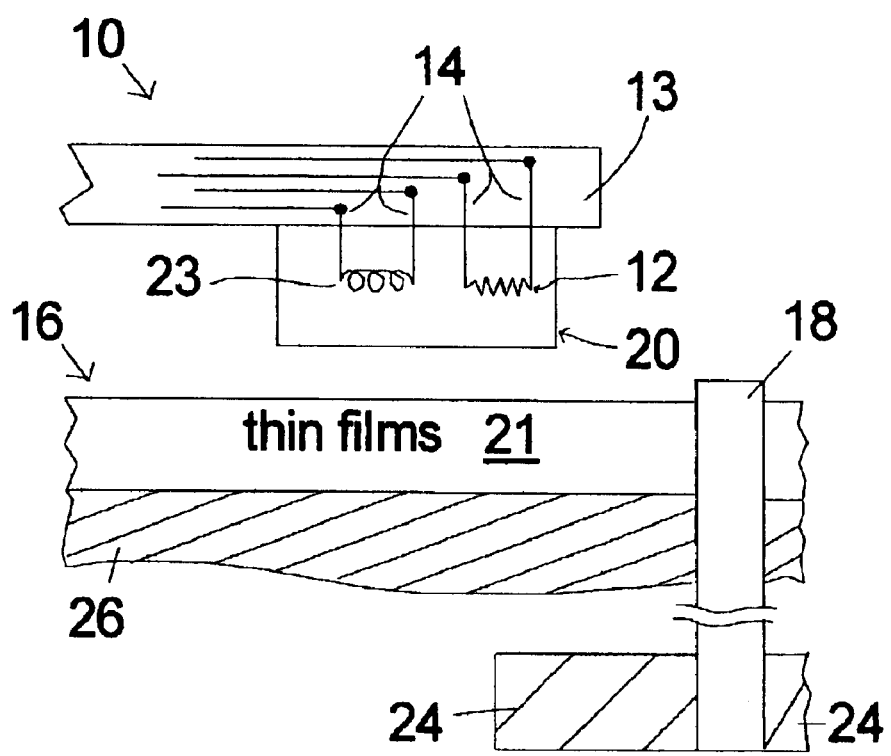
FIG. 1 is an illustration of the prior art showing the relationships between the head and associated components in a disk drive.
Figure 2:
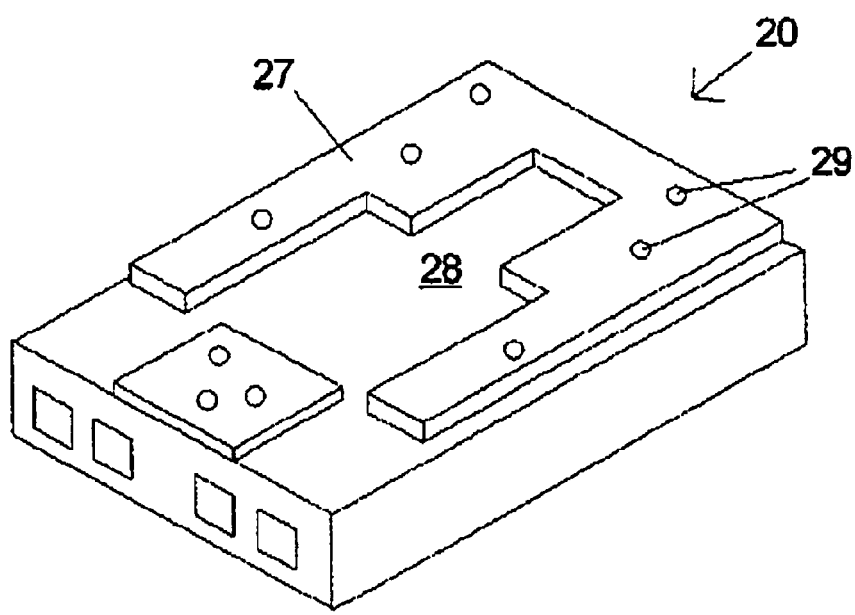
FIG. 2 is an illustration of a prior art landing pad structure on the air-bearing surface of a slider.
Figure 3:
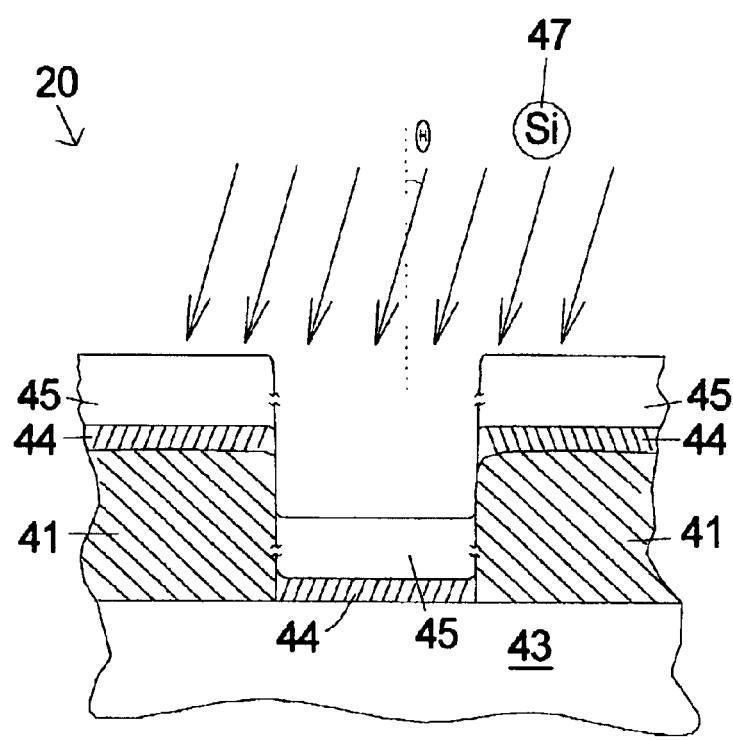
FIG. 3 is an illustration of the vertical deposition of the masking layer according to the invention on a slider pad structure.

The invention will now be described with reference to FIG. 3 which illustrates a transducer encapsulated in a slider which has pads structured according to the invention. FIG. 3 shows a segment of a transducer 20 containing a plurality of magnetic transducers formed by prior art techniques. The void between photoresist deposits 41 is also formed by prior art techniques. The photoresist material 41 is formed on layer 43 of material which forms the body of the slider. The adhesion layer 44 is deposited over the photoresist and the void. The adhesion layer 44 for use with a carbonaceous pad material can be any carbide forming material such as titanium or silicon with silicon being preferred. These materials usually oxidize upon ashing. The adhesion layer 44 is also preferably deposited vertically for reasons similar to those given for the masking layer 46. The adhesion layer 44 is relatively thin in comparison to the subsequent functional layers and need only be thick enough to serve the adhesion function which suggests a possible range from around 10 angstroms upward. The thickness of the adhesion layer, like the other layers, should be determined empirically given the design requirements of the storage systems in which the slider will be used. One of the design requirements will be the total thickness of the pads including the adhesion layer since this limits the spacing between the magnetic sensors embedded in the slider and the magnetic recording medium.

The pad layer 45 is deposited to a thickness much larger than that of the adhesion layer 44. In general, the thickness of the pad layer is determined by prior art principles, for example, to optimize the stiction and wear resistance. Current designs use a pad layer thickness of about of about 150–600 angstroms. The preferred material for the pads is diamond-like-carbon (DLC). The carbon may be hydrogenated, nitrogenated and/or include other functional dopants. Other durable materials may be used for the pads within the scope of the invention, so long as the material is sufficiently subject to volatization (i.e., forming gaseous phase reduction products) during ashing in an oxygen plasma or in another plasma.

Figure 4:
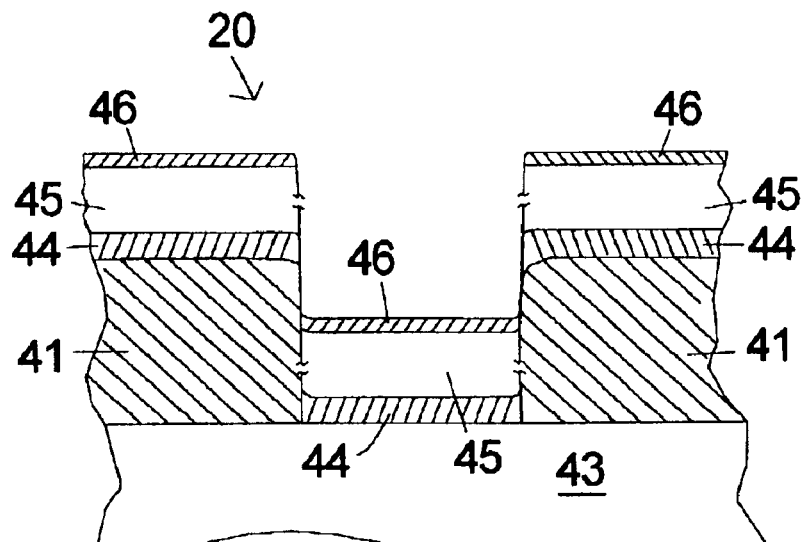
FIG. 4 is an illustration of the pad structure after the vertical deposition process according to the invention.

The masking material 47 is shown in the process of deposition in FIG. 3. The masking material 47 should preferably be a material which will passivate by forming a dense, adhering oxide when exposed to oxygen. Silicon is preferred. The arrows indicate that the deposition is constrained so that the angle of deposition theta ($\Theta$) is small, i.e., substantially perpendicular to the surface (vertical deposition). Vertical deposition is used to minimize the sidewall buildup of the material being deposited. Vertical deposition is achieved by prior art techniques such as ion beam deposition or biased sputtering. FIG. 4 shows the state of the ABS after the masking layer 46 has been deposited.

Figure 5:
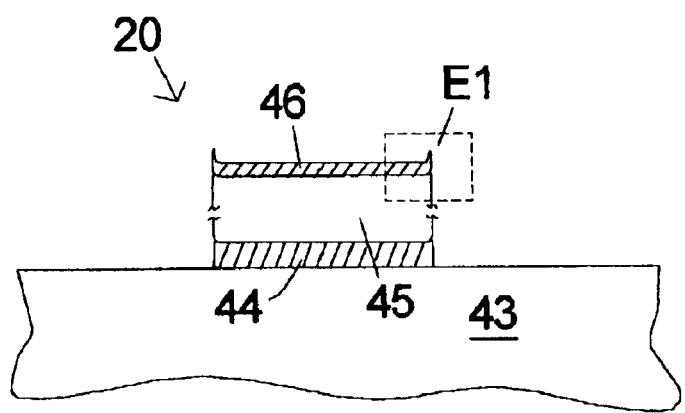
FIG. 5 illustrates state of the fabrication of the pad structure after the photoresist has been striped during a process according to the invention.
Figure 6:
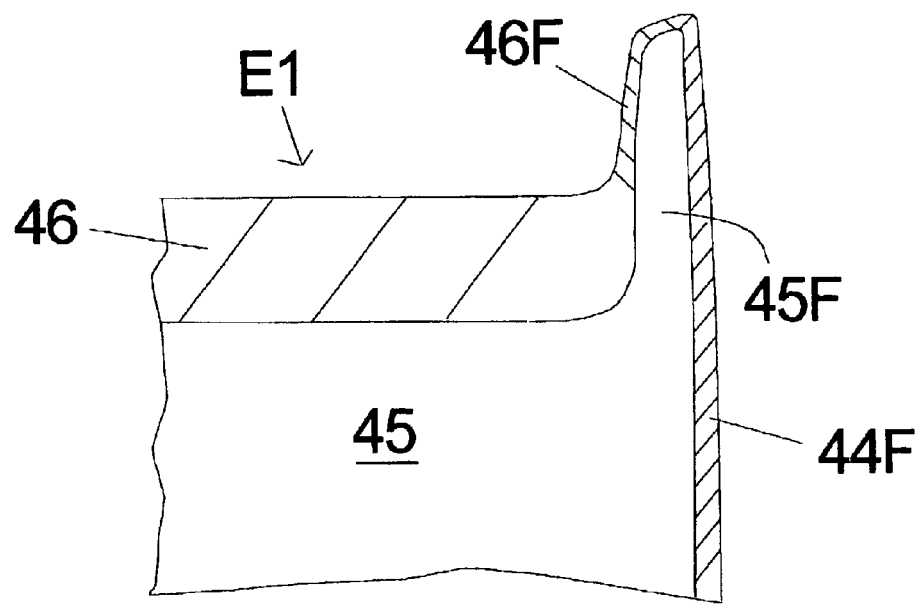
FIG. 6 illustrates an enlarged view of the area labeled E1 in FIG. 5.
Figure 7:
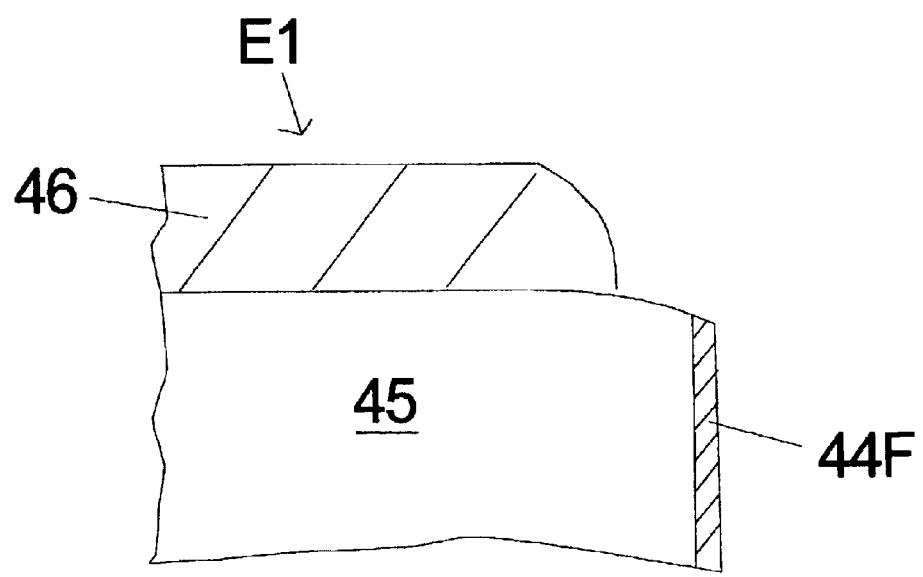
FIG. 7 illustrates an enlarged view of the area labeled E1 in FIG. 6 after oxygen plasma ashing and mechanical abrasion according to the invention.
Figure 8:
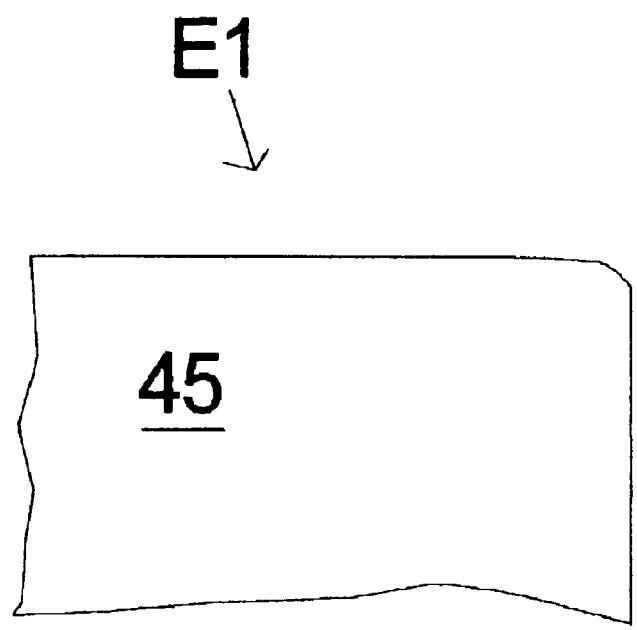
FIG. 8 illustrates an enlarged view of the area labeled E1 in FIG. 7 after sputter-etching according to the invention.

FIG. 5 shows the structure after the photoresist material 41 has been removed. Preferably the photoresist material 41 is stripped by a technique which will provide some weakening or reduction in the fences by mechanical abrasion, for example, soda blast, or solvent assisted scrubbing. FIG. 6 shows an enlarged view of the area labeled E1 in FIG. 5 to more clearly illustrate the microstructure/micro-layout of the edge of the masking layer 46 and the pad layer 45. The raised structures 46F and 45F are the undesirable fences mentioned previously. A remnant 44F is left over from the deposition of the adhesion layer 44. FIG. 7 shows the result of ashing the structure in an oxygen plasma. The oxygen ashes the carbon in the thin fence structures and together with mechanical erosion during resist removal, destroys the integrity of the fences leaving more rounded structures which are preferable for the edges of pad layer 45. Since the masking layer protecting the pad is thicker and develops passivating oxides, it provides continuous coverage and protection of the pad layer 45. Although the embodiment described includes stripping the resist before the ashing step, it is expected that ashing prior to stripping the resist will achieve similar results. FIG. 8 shows the result of the removal of the masking material 47 by sputter-etching leaving the pad layer 45 with rounded edges. Optionally additional overcoat layers may be deposited on pads and slider surface.

Except where express materials, thickness values, etc., have been given above, the layers, structures and materials in a head embodying the invention are according to the prior art and are fabricated according to the prior art.

The compositions given herein have been described without regard to small amounts of impurities that are inevitably present in practical embodiments as is well known to those skilled in the art.

Although the embodiments of the invention have been described in a particular embodiment, the invention as described herein is not limited to this application and various changes and modifications will be apparent to those skilled in the art which will be within the scope of the invention.

What is claimed is:

1. A method for fabricating pads on a slider for a magnetic transducer comprising the steps of:
    forming a slider body including a magnetic transducer;
    forming voids in photoresist material to define locations and shapes of the pads on the slider body, the voids having sidewalls;
    depositing a pad layer over the slider body, the pad layer forming fences on the sidewalls of the voids and having a surface;
    anisotropically depositing a masking layer, the masking layer being thinner on the fences on the sidewalls than on the surface of the pad layer;
    stripping the photoresist material to remove the pad layer and masking layer except in the voids;
    removing the fences from the pad layer by ashing; and
    removing the masking layer.

2. The method of claim 1 further comprising the step of anisotropically depositing an adhesion or seed layer, the adhesion or seed layer being thinner on the sidewalls than on a bottom surface of the voids, after forming the voids and before depositing the pad layer and the step of removing the masking layer further comprising removing the adhesion or seed layer from the sidewalls.

3. The method of claim 2 wherein the adhesion or seed layer is a carbide forming material.

4. The method of claim 2 wherein the adhesion or seed layer is silicon.

5. The method of claim 1 wherein the step of anisotropically depositing the masking layer further comprises depositing the masking layer in a direction substantially normal to the surface of the pad layer using an ion beam.

6. The method of claim 1 wherein the step of stripping the photoresist material includes use of mechanical abrasion.

7. The method of claim 1 wherein the step of stripping the photoresist material includes use of a soda blast.

8. The method of claim 1 wherein the step of stripping the photoresist material includes solvent assisted scrubbing.

9. The method of claim 1 wherein the step of removing the fences from the pad layer by ashing further comprises exposing the fences to an oxygen containing plasma.

10. The method of claim 1 wherein the pad layer is diamond-like carbon.

11. The method of claim 1 wherein the masking layer is a passivating oxide forming material.

12. The method of claim 1 wherein the step of anisotropically depositing the masking layer further comprises depositing the masking layer in a direction substantially normal to the surface of the pad layer using biased sputtering.

13. A method for fabricating pads on a slider for a magnetic transducer comprising the steps of:
    forming a slider body including a magnetic transducer;
    depositing photoresist material on a surface of the slider body;
    forming voids in photoresist material to define locations and shapes of the pads;
    vertically depositing an adhesion or seed layer over the photoresist and the voids;
    depositing a pad layer over the adhesion or seed layer, the pad layer being composed of a first material which volatilizes when exposed to oxygen plasma;
    vertically depositing a masking layer, the masking layer being composed of a second material that forms passivating oxides when exposed to oxygen;
    stripping the photoresist material to remove adhesion or seed layer, pad layer and masking layer except in the voids;
    removing fence material from the pad layer by ashing with an oxygen containing plasma; and
    removing the masking layer and the adhesion or seed layer in the voids.

14. The method of claim 13 wherein the adhesion layer is silicon.

15. The method of claim 13 wherein the pad layer is diamond-like carbon.

16. The method of claim 13 wherein the masking layer is silicon.

17. The method of claim 13 wherein the adhesion layer is silicon, the pad layer is diamond-like carbon and the masking layer is silicon.

18. The method of claim 13 wherein the step of removing the masking layer further comprises sputter-etching.

19. The method of claim 13 wherein the step of stripping the photoresist material further comprises mechanically abrading the photoresist material.

20. The method of claim 13 wherein the step of stripping the photoresist material further comprises use of a soda blast or solvent assisted scrubbing.

21. A method for fabricating pads on a slider for a magnetic transducer comprising the steps of:
    forming a slider body including a magnetic transducer;
    forming voids in photoresist material to define locations and shapes of the pads on the slider body, the voids having sidewalls;
    depositing a pad layer over the slider body, the pad layer forming fences on the sidewalls of the voids and having a surface;
    anisotropically depositing a masking layer, the masking layer being thinner on the fences on the sidewalls than on the surface of the pad layer;
    removing the fences from the pad layer by ashing;
    stripping the photoresist material to remove the pad layer and masking layer except in the voids; and
    removing the masking layer.

22. The method of claim 21 further comprising the step of anisotropically depositing an adhesion or seed layer, the adhesion or seed layer being thinner on the sidewalls than on a bottom surface of the voids, after forming the voids and before depositing the pad layer.

23. The method of claim 22 wherein the adhesion or seed layer is a carbide forming material.

24. The method of claim 22 wherein the adhesion or seed layer is silicon.

25. The method of claim 21 wherein the step of anisotropically depositing the masking layer further comprises depositing the masking layer in a direction substantially normal to the surface of the pad layer using an ion beam.

26. The method of claim 21 wherein the step of stripping the photoresist material includes use of mechanical abrasion.

27. The method of claim 21 wherein the step of removing the fences from the pad layer by ashing further comprises exposing the fences to an oxygen containing plasma.

28. The method of claim 21 wherein the masking layer is an oxide forming material.

29. The method of claim 21 wherein the step of anisotropically depositing the masking layer further comprises depositing the masking layer in a direction substantially normal to the surface of the pad layer using biased sputtering.

* * * * *